United States Patent
Ando et al.

(10) Patent No.: US 10,933,866 B2
(45) Date of Patent: Mar. 2, 2021

(54) METHOD FOR CONTROLLING ELECTRICALLY DRIVEN VEHICLE, AND ELECTRICALLY DRIVEN VEHICLE

(71) Applicant: Panasonic Corporation, Osaka (JP)

(72) Inventors: Takeshi Ando, Tokyo (JP); Noriaki Imaoka, Tokyo (JP); Hiroyuki Uematsu, Tokyo (JP)

(73) Assignee: PANASONIC CORPORATION, Osaka (JP)

( * ) Notice: Subject to any disclaimer, the term of this patent is extended or adjusted under 35 U.S.C. 154(b) by 183 days.

(21) Appl. No.: 16/320,138

(22) PCT Filed: Apr. 3, 2018

(86) PCT No.: PCT/JP2018/014222
§ 371 (c)(1),
(2) Date: Jan. 24, 2019

(87) PCT Pub. No.: WO2018/190189
PCT Pub. Date: Oct. 18, 2018

(65) Prior Publication Data
US 2019/0270450 A1 Sep. 5, 2019

(30) Foreign Application Priority Data
Apr. 13, 2017 (JP) .............................. JP2017-079332

(51) Int. Cl.
*B60W 30/09* (2012.01)
*B60Q 9/00* (2006.01)
(Continued)

(52) U.S. Cl.
CPC ............. *B60W 30/09* (2013.01); *A61G 5/104* (2013.01); *B60Q 9/00* (2013.01); *B60W 50/14* (2013.01);
(Continued)

(58) Field of Classification Search
CPC ...................................................... B60W 30/09
See application file for complete search history.

(56) References Cited

U.S. PATENT DOCUMENTS

| 4,898,508 A | 2/1990 | Hayata |
| 5,363,933 A | 11/1994 | Yu et al. |

(Continued)

FOREIGN PATENT DOCUMENTS

| FR | 2660454 A1 | 10/1991 |
| JP | S63-8081 | 1/1988 |

(Continued)

OTHER PUBLICATIONS

Extended European Search Report issued in Patent Application No. EP 18 78 4824 dated Feb. 28, 2020.
(Continued)

*Primary Examiner* — Alex C Dunn
(74) *Attorney, Agent, or Firm* — Pearne & Gordon LLP

(57) ABSTRACT

According to a control method for an electric vehicle of the present invention, when an electric vehicle (100) moves at a first velocity and approaches an object (200) on the basis of instructed information, the electric vehicle (100) is temporarily stopped at a position at which the distance between the electric vehicle (100) and the object (200) is a first stopping distance, after which the velocity is switched to a second velocity that is slower than the first velocity, the electric vehicle (100) is caused to approach the object (200), and the electric vehicle (100) is stopped at position at which the distance between the electric vehicle (100) and the object (200) is a second stopping distance that is shorter than the first stopping distance.

11 Claims, 3 Drawing Sheets

(51) Int. Cl.
*B60W 50/14* (2020.01)
*G05D 1/02* (2020.01)
*A61G 5/10* (2006.01)
*G08G 1/16* (2006.01)

(52) U.S. Cl.
CPC ............ *G05D 1/02* (2013.01); *G08G 1/16* (2013.01); *B60W 2050/143* (2013.01); *B60W 2050/146* (2013.01); *B60W 2554/00* (2020.02); *B60W 2720/10* (2013.01); *B60Y 2200/91* (2013.01)

(56) References Cited

U.S. PATENT DOCUMENTS

| | | | |
|---|---|---|---|
| 6,108,592 A | 8/2000 | Kurtzberg et al. | |
| 2002/0156580 A1* | 10/2002 | Matsuura | B62D 1/28 701/301 |
| 2009/0312890 A1* | 12/2009 | Evans | B61L 17/00 701/2 |
| 2009/0319139 A1* | 12/2009 | Kondou | F16H 59/66 701/55 |
| 2011/0009238 A1* | 1/2011 | Baba | B61B 10/04 477/185 |
| 2012/0078466 A1* | 3/2012 | Natori | B60T 7/22 701/36 |
| 2013/0030668 A1* | 1/2013 | Eriksson | B60W 10/11 701/94 |
| 2013/0302124 A1* | 11/2013 | Matsuyama | E02F 9/265 414/687 |
| 2014/0121938 A1* | 5/2014 | Takahashi | B60Q 7/005 701/101 |
| 2014/0358418 A1* | 12/2014 | Nakajima | B60W 30/09 701/301 |
| 2015/0112566 A1* | 4/2015 | Takagi | B60W 10/06 701/70 |
| 2016/0214604 A1* | 7/2016 | Kida | B60T 7/22 |
| 2018/0134285 A1* | 5/2018 | Cho | B60Q 9/00 |
| 2018/0312110 A1* | 11/2018 | Takae | G08G 1/16 |
| 2019/0016338 A1* | 1/2019 | Ishioka | B60W 30/18163 |

FOREIGN PATENT DOCUMENTS

| | | |
|---|---|---|
| JP | H02-023007 A | 1/1990 |
| JP | H11-305837 A | 11/1999 |
| JP | 2003-334218 A | 11/2003 |
| JP | 2004-050925 A | 2/2004 |
| JP | 2006-306233 A | 11/2006 |
| JP | 2007-097946 A | 4/2007 |
| JP | 2011-177205 A | 9/2011 |
| JP | 2012-144162 A | 8/2012 |
| JP | 2015-113205 A | 6/2015 |
| JP | 2015-204946 A | 11/2015 |
| WO | 2016-163035 A1 | 10/2016 |

OTHER PUBLICATIONS

International Search Report issued in Patent Application No. PCT/JP2018/014222 dated Jul. 10, 2018.
Written Opinion issued in Patent Application No. PCT/JP2018/014222 dated Jul. 10, 2018.

* cited by examiner

METHOD FOR CONTROLLING ELECTRICALLY DRIVEN VEHICLE, AND ELECTRICALLY DRIVEN VEHICLE

TECHNICAL FIELD

The present invention relates to a control method for an autonomous electric vehicle and an electric vehicle.

BACKGROUND ART

There are known electric vehicles having a function of stopping travel of the electric vehicle by detecting an obstacle with an obstacle detection sensor as well as a function of moving through an operation by a person. However, when the obstacle is detected excessively, and the travel of the electric vehicle is stopped, the electric vehicle cannot fully cover such a situation that the electric vehicle is intended to approach a specific target object. In view of this, in particular, a travel control method for an electric vehicle which enables an extremely precise operation is disclosed (see, for example, PTL 1).

In this travel control method for an electric vehicle, information of presence or absence of an obstacle from the obstacle detection sensor is input to travel permission determination section. In a case in which the obstacle is detected, alarm issuing section is instructed to issue an alarm, and motor drive section is instructed to stop in action so that the electric vehicle is temporarily stopped in action, and collision against the obstacle is avoided. After that, a subsequent operation instruction is waited. In a case in which a travel instruction including a direction in which an obstacle is being detected is received from controller again, travel permission (instruction) is issued to the motor drive section and travel is permitted while an alarm issuing instruction is transmitted to alarm issuing section again.

Further, a configuration of an electric vehicle which achieves the above-mentioned action is also disclosed. The configuration disclosed in the related art is such that the obstacle detection sensor is installed in an electric vehicle main body and disposed at a foremost part of a seating surface.

In this configuration, an obstacle in front of the electric vehicle is detected, and the electric vehicle is temporarily stopped so that collision can be avoided. In a case in which an operation instruction including a direction in which the obstacle is detected is issued again, an action is allowed while attention is called on an occupant. Thus, operations can be carried out easily, specifically, detour near the obstacle, separation from and approach to the obstacle, passage along the obstacle, and accommodation of the vehicle body near a wall on an interior side. In addition, travel near the obstacle can be carried out without following a particular procedure such as releasing of the obstacle detection means.

CITATION LIST

Patent Literature

PTL 1
Japanese Patent Application Laid-Open No. 2011-177205

SUMMARY OF INVENTION

Technical Problem

However, in the travel control method for an electric vehicle disclosed in PTL 1, the operations can be carried out easily, specifically, detour near the obstacle, separation from and approach to the obstacle, passage along the obstacle, and accommodation of the vehicle body near the wall on an interior side. Meanwhile, the electric vehicle may come into contact with the wall or an object due to a fault in operation by an occupant, and a problem including a matter concerning safety arises.

The present invention has been made in view of the problem inherent in the related art, and an object of the present invention is to provide an electric vehicle, which is capable of not only allowing an extremely precise operation such as approach to an obstacle (exchange of an object on a counter) but also avoiding contact with a wall or an object even in a case in which a fault is caused in an operation in which precision is required.

Solution to Problem

In order to achieve the object mentioned above, a control method according to the present invention is a control method for an electric vehicle which stops in accordance with a distance to a surrounding object, the control method including: causing, in a case where the electric vehicle moves at a first speed and approaches a target object based on instructed information, the electric vehicle to stop temporarily at a position at which a distance between the electric vehicle and the target object reaches a first stop distance, then switching the speed to a second speed lower than the first speed to bring the electric vehicle closer to the target object and causing the electric vehicle to stop at a position at which the distance between the electric vehicle and the target object reaches a second stop distance shorter than the first stop distance.

Advantageous Effects of Invention

As described above, with the electric vehicle according to the present invention, it is possible to not only allow an extremely precise operation such as approach to the obstacle (exchange of an object on a counter) but also avoid contact with a wall or an object even in a case in which a fault is caused in an operation in which precision is required, and safe movement can be continued.

DESCRIPTION OF EMBODIMENTS

Hereinafter, Embodiment of the present invention is described with reference to the accompany drawings. Note that, the same constituent elements are denoted by the same reference symbols. Further, in the accompany drawings, for the sake of easy understanding, the constituent elements are schematically illustrated as main objects.

Embodiment 1

Figure 1:
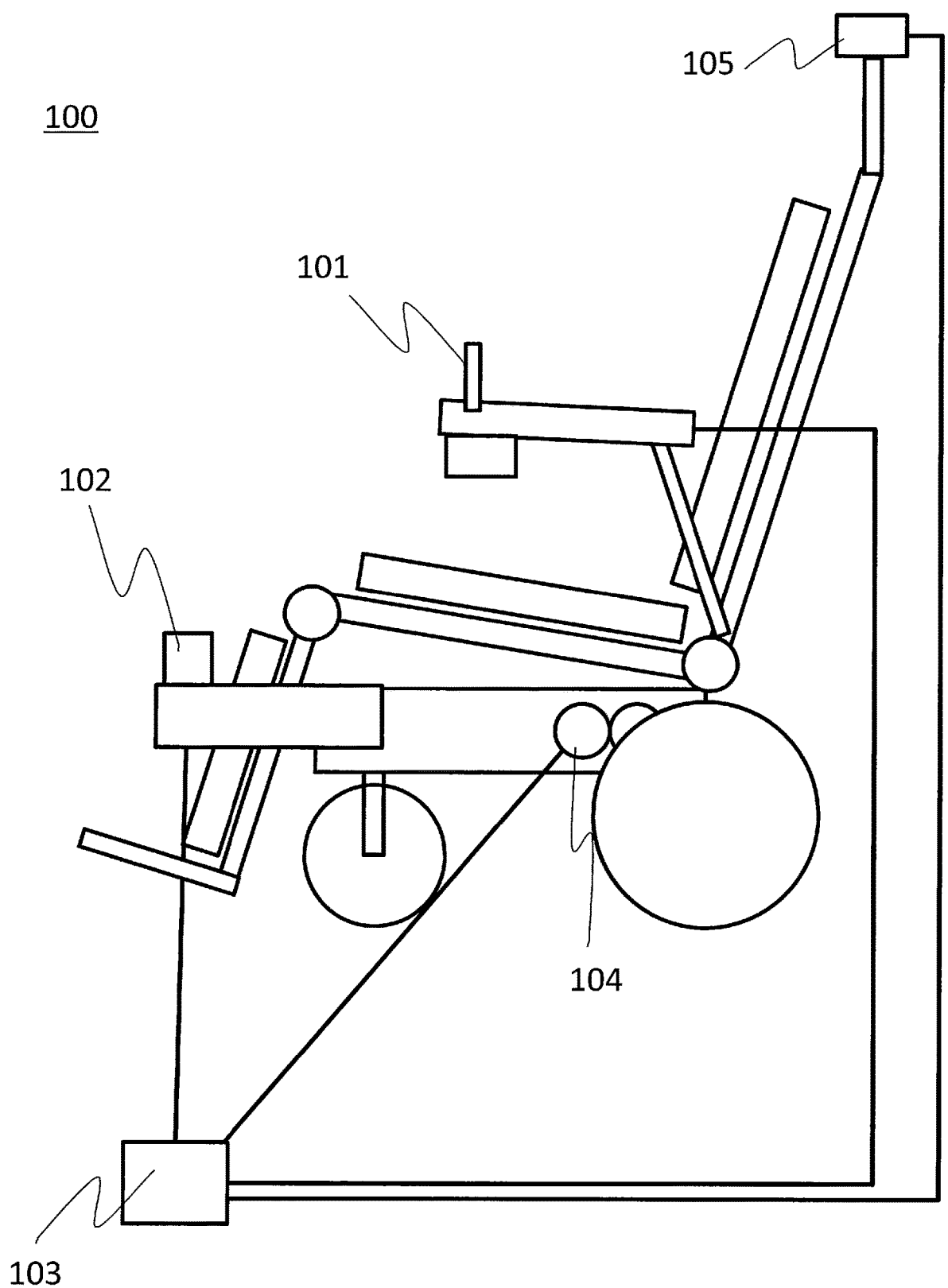
FIG. 1 is a schematic view of an electric vehicle in Embodiment 1 of the present invention.

FIG. 1 is a schematic side view of electric vehicle 100 in Embodiment 1 of the present invention.

As illustrated in FIG. 1, electric vehicle 100 of Embodiment 1 includes operation section 101 that allows an occupant to designate a travel direction and a speed, obstacle detection sensor 102 that calculates a direction and a distance of an object that exists in an environment, controller 103 that determines the travel direction and the speed based on information input by operation section 101 and information detected by obstacle detection sensor 102, drive section 104 that drives electric vehicle 100 in the direction and at the speed which are determined by controller 103, and running-state notifier 105 that notifies a running state of electric vehicle 100.

Operation section 101 is provided for allowing an occupant to designate a behavior of electric vehicle 100, and includes travel-direction designation section that designates a travel direction and movement-speed selection section that designates a moving speed in the direction. As operation section 101, a joystick is used in many cases. Operation section 101 can be used for estimating the moving speed of electric vehicle 100. When an accurate moving speed is desired to be estimated, information obtained by a sensor such as an encoder installed on, for example, a wheel of electric vehicle 100 can be used.

Obstacle detection sensor 102 radiates laser so as to detect an object around electric vehicle 100 and measures a distance from surroundings, so that obstacle detection sensor 102 can calculate a position and a direction of the obstacle therearound. Specifically, obstacle detection sensor 102 scans, with infrared laser light, a semicircular field at a fine pitch such as 0.36° by about 270°, and detects a distance to the surrounding object based on a time period until reflection light of the infrared laser light is observed.

Further, obstacle detection sensor 102 is used for estimating a current position of electric vehicle 100 by matching environment information such as a wall around electric vehicle 100 obtained from obstacle detection sensor 102 and environment information such as a wall near a passage for autonomous travel, which is registered in advance. Moreover, obstacle detection sensor 102 can be used for avoiding an obstacle by detecting an obstacle such as a person or an object, which is not registered, in the passage for autonomous travel, which is registered in advance.

Controller 103 calculates braking distance L(V), which is required for deceleration based on the direction and speed V designated through operation section 101, and calculates first stop distance L1(=L(V)+ΔL1) obtained by adding first stop distance margin ΔL1, which is not dependent on the moving speed, to braking distance L(V). Then, in a case in which distance l(t) to the obstacle at time t detected by obstacle detection sensor 102 is larger than first stop distance L1, controller 103 outputs, to drive section 104, a signal for moving electric vehicle 100 in the direction designated through operation section 101 at the speed designated through operation section 101. In a case in which distance l(t) described above is equal to or smaller than first stop distance L1, controller 103 outputs a signal for stopping drive of drive section 104 to drive section 104, and temporarily stops electric vehicle 100.

Next, in a case in which electric vehicle 100 is desired to be moved again after electric vehicle 100 is stopped, designation of movement in the direction of the obstacle detected by obstacle detection sensor 102 is input through operation section 101, and, in a case in which distance l(t) to the obstacle is smaller than a value obtained by adding braking distance L(V) at speed V designated through operation section 101 to first stop distance margin ΔL1, controller 103 instructs drive section 104 to move electric vehicle 100 at constant speed V2 set in advance irrespective of speed V designated through operation section 101. In a case in which electric vehicle 100 is moved in the movement direction designated through operation section 101 at constant speed V2, controller 103 calculates second stop distance L2(=L(V2)+ΔL2) obtained by adding second stop distance margin ΔL2, which is not dependent on the moving speed, to braking distance L(V2) at constant speed V2. In a case in which distance l(t) to the obstacle, which is detected by obstacle detection sensor 102, is equal to or smaller than second stop distance L2, controller 103 outputs the signal for stopping drive of drive section 104 to drive section 104. According to a result of a heuristic analysis by the inventers, it is desired that first stop distance margin ΔL1 be 0.3 m≤ΔL1≤0.5 m, and that second stop distance margin ΔL2 be 0.05 m≤ΔL2≤0.1 m.

Note that, it is desired that constant speed V2 be set to be as high as possible in view of movement efficiency. Specifically, constant speed V2 is set to be the highest speed under a condition that second stop distance L2 is larger than distance V2×Δt obtained by multiplying constant speed V2 and time interval Δt of larger one of sampling time interval Δts of obstacle detection sensor 102 and instruction time interval Δtd from controller 103 to drive section 104. This is a condition for safely stopping electric vehicle 100 even in a case in which an obstacle slightly distant from the distance at which determination of stop is made exists in a stop region after one sampling, and V2 and Δt are to be set so as to satisfy expression 1 below.

[Expression 1]

$$V2 \times \Delta t < L2 = L(V2) + \Delta L2 < \Delta L1 \quad (1)$$

According to a result of a heuristic analysis by the inventers, it is desired that constant speed V2 be 0.05 m/s≤V2≤0.1 m/s.

In order to achieve the behavior of electric vehicle 100 determined by controller 103, drive section 104 includes a wheel, a gear, a motor, a motor driver, a battery, and the like, which are required for drive section 104 to move at the speed instructed by controller 103 in the direction instructed by controller 103.

Running-state notifier 105 is an apparatus that notifies a state of travel with light to an occupant or a person around electric vehicle 100. In this case, a state of distance l(t) to the object detected by obstacle detection sensor 102 is visually notified in three patterns with color or blinking of lighting illumination. The first is a case in which distance l(t) is larger than first stop distance L1, the second is a case in which distance l(t) is larger than second stop distance L2 and equal to or smaller than first stop distance L1, and the third is a case in which distance l(t) is equal to or smaller than second stop distance L2.

Figure 2:
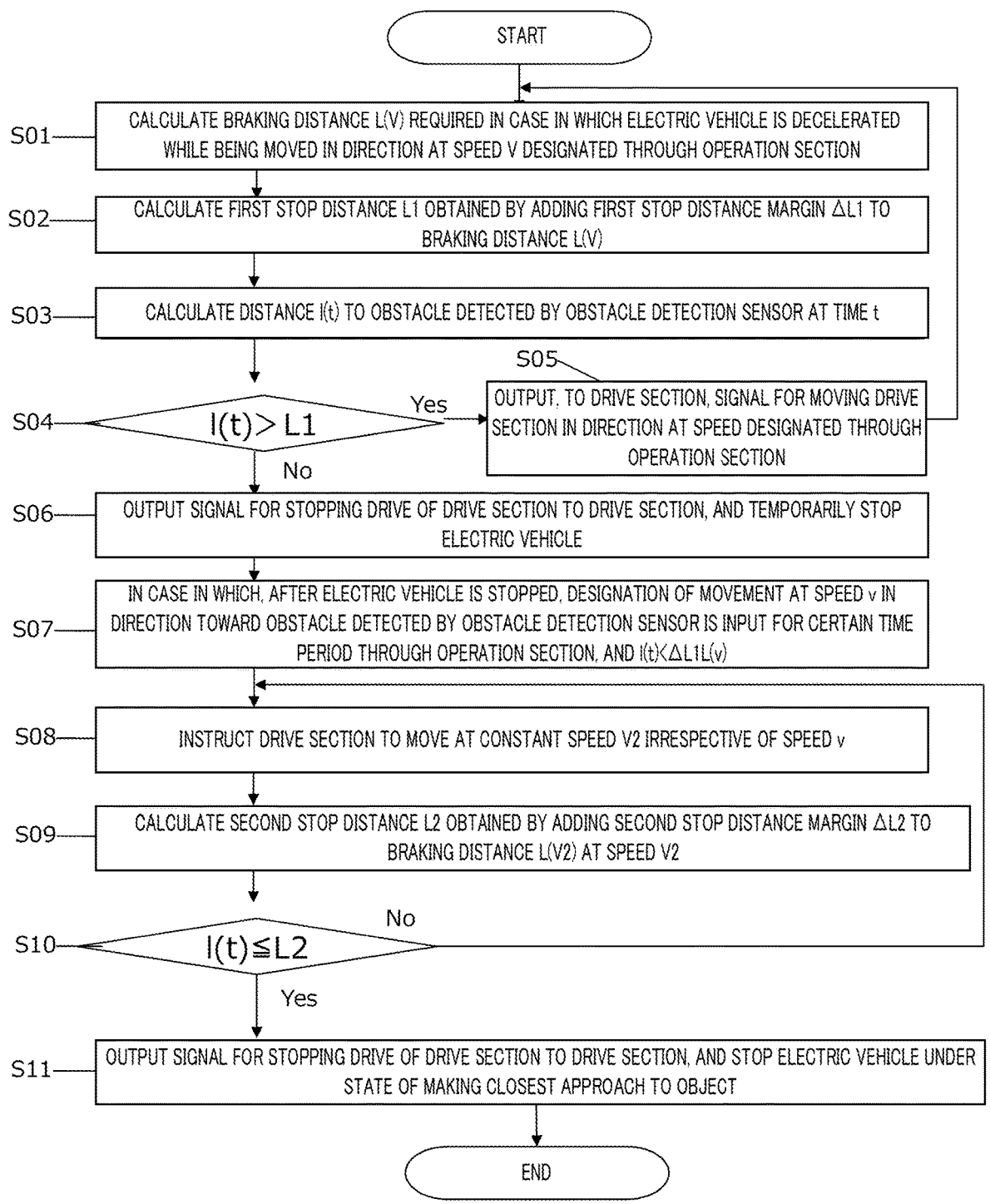
FIG. 2 is a flowchart relating to detection of an obstacle and a behavior of an electric vehicle in Embodiment 1.
Figure 3:
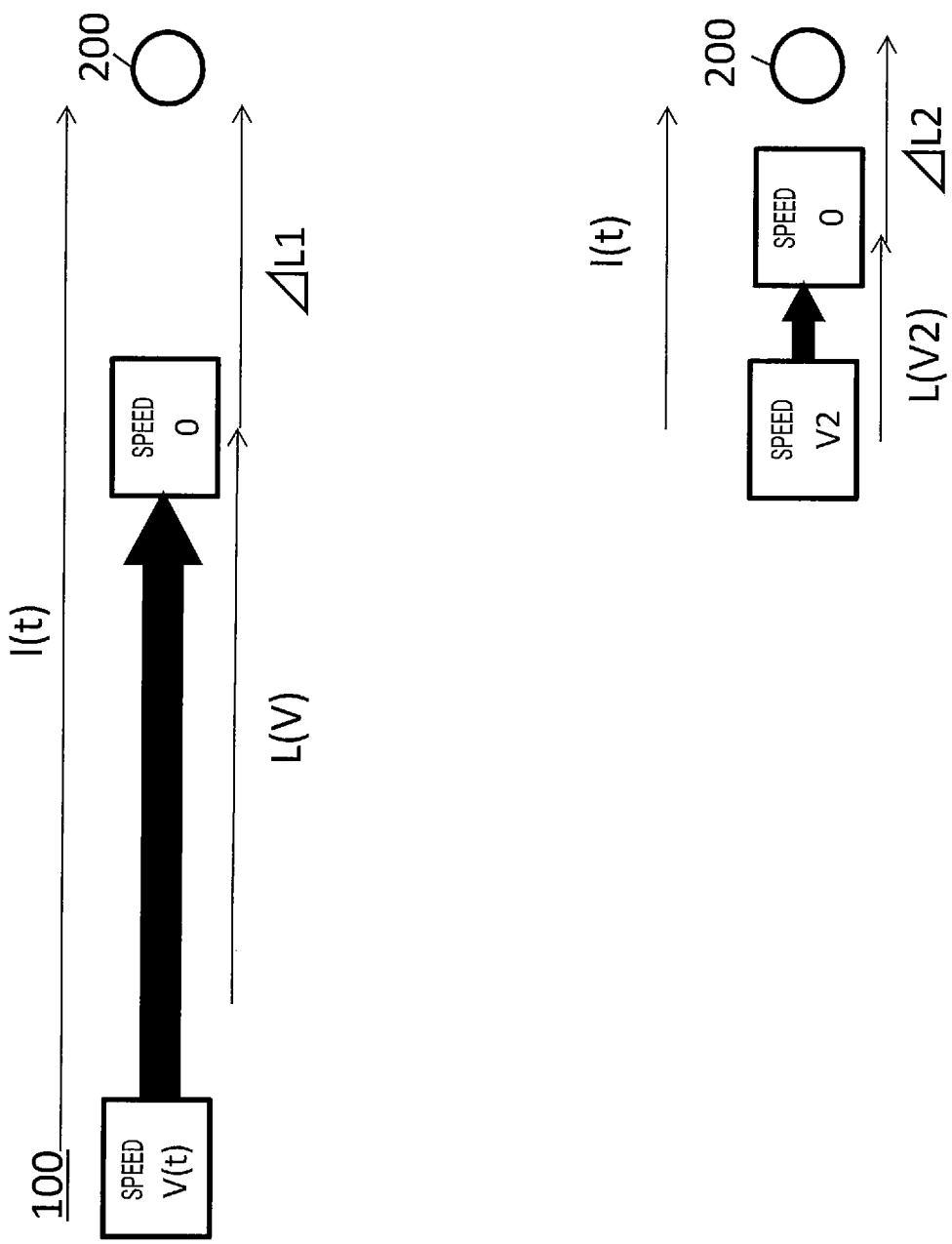
FIG. 3 is a conceptual diagram relating to the behavior of the electric vehicle in Embodiment 1.

Next, FIG. 2 illustrates a flowchart relating to detection of the obstacle by electric vehicle 100 and the behavior of electric vehicle 100 according to the present invention, and FIG. 3 illustrates a conceptual diagram relating to the behavior.

First, braking distance L(V) required in a case in which electric vehicle 100 is decelerated while being moved in the direction designated through operation section 101 at speed V designated through operation section 101 is calculated (Step S01). First stop distance L1(=L(V)+ΔL1) obtained by adding first stop distance margin ΔL1, which is not dependent on moving speed V, to braking distance L(V) is calculated (Step S02). Then, distance l(t) to obstacle 200 detected by obstacle detection sensor 102 at time t is calculated (Step S03). Distance l(t) to obstacle 200 and first stop distance L1 thus calculated are compared with each other (Step S04). In a case in which distance l(t) to obstacle 200 is larger than first stop distance L1, a signal for moving electric vehicle 100 in the direction designated through operation section 101 at the speed designated through operation section 101 is output to drive section 104 (Step S05). In a case in which distance l(t) to obstacle 200 is equal to or smaller than first stop distance L1, the signal for stopping drive of drive section 104 is output to drive section 104, and electric vehicle 100 is temporarily stopped (Step S06). Note that, in a case in which, after electric vehicle 100 is stopped, designation of movement in a direction toward obstacle 200 detected by obstacle detection sensor 102 is input continuously for a certain time period through operation section 101, and distance l(t) to obstacle 200 is smaller than a value obtained by adding braking distance L(V) at speed V designated through operation section 101 to first stop distance margin ΔL1 (Step S07), drive section 104 is instructed to move electric vehicle 100 at constant speed V2 set in advance irrespective of speed V designated through operation section 101 (Step S08). Note that, according to a result of a heuristic analysis by the inventors, it is desired that the certain time period be from 0.5 seconds to 1 second.

Further, in a case in which electric vehicle 100 is moved at constant speed V2 in the movement direction designated through operation section 101, second stop distance L2(=L(V2)+ΔL2) obtained by adding second stop distance margin ΔL2, which is not dependent on the moving speed, to the braking distance L(V2) at constant speed V2 is calculated (Step S09). Distance l(t) to obstacle 200 detected by obstacle detection sensor 102 and second stop distance L2 are compared with each other (Step S10). In a case in which distance l(t) to obstacle 200 is equal to or smaller than second stop distance L2, the signal for stopping drive of drive section 104 is outputted to drive section 104, and electric vehicle 100 is stopped under a state of making closest approach to the object (Step S11). Further, in a case in which distance l(t) to obstacle 200 is larger than second stop distance L2, processing subsequent to step S08 is performed again.

According to a result of a heuristic analysis and an evaluation by the inventors, it is desired that the first stop distance be set to from 0.5 m to 3 m, and the second stop distance be set to from 0.05 m to 1 m in view of balancing operability and safety.

Note that, as obstacle detection sensor 102, a Time-of-Flight (TOF) sensor may be used. In this case, as compared to the case of using the laser sensor, cost of electric vehicle 100 can be reduced.

Note that, as obstacle detection sensor 102, a stereo camera may be used. In this case, in addition to depth information, color information or the like can be acquired. Thus, detailed information about a user or obstacle 200 is acquired, so that highly accurate personal recognition or correct avoidance of obstacle 200 can be achieved.

Note that, as obstacle detection sensor 102, a sensor that is not mounted in electric vehicle 100, such as a monitoring camera installed in a travel environment may be used. With this, cost of electric vehicle 100 can be reduced, and obstacle 200 that cannot be directly detected by electric vehicle 100 can be grasped in advance.

Note that, first stop distance L1 may be variable. For example, a first stop distance (third stop distance) in a case in which electric vehicle 100 is moved away from the target object can be set to be larger than a first stop distance in a case in which electric vehicle 100 is moved closer to the target object. With this, when electric vehicle 100 is stopped or moved near the first stop distance, information issued from running-state notifier 105 can be prevented from being frequently changed, so that a state of electric vehicle 100 can be appropriately informed to a user or a person around electric vehicle 100.

Note that, running-state notifier 105 may use audio information. With this, an alarm can be effectively issued to a person or an occupant with whom electric vehicle 100 may come in contact.

Note that, running-state notifier 105 may use tactile information such as power or vibration to operation section 101. With this, an alarm can be issued to an occupant effectively even in an environment in which noise is large.

The entire disclosure of Specification, Drawings, and Abstract included in Japanese Patent Application No. 2017-079332, filed on Apr. 13, 2017 is incorporated herein by reference.

INDUSTRIAL APPLICABILITY

The electric vehicle according to the present invention is effective in a field in which movement to interior or exterior is required, such as nursing care or welfare.

REFERENCE SIGNS LIST

100 Electric vehicle
101 Operation section
102 Obstacle detection sensor
103 Controller
104 Drive section
105 Running-state notifier
200 Obstacle

The invention claimed is:

1. A control method for an electric vehicle which stops in accordance with a distance to a surrounding object, the control method comprising:
   causing, in a case where the electric vehicle is moved at a first speed to approach a target object based on an instruction to move in a direction of the target object, the electric vehicle to stop temporarily at a position at which a distance between the electric vehicle and the target object reaches a first stop distance,
   subsequently, bringing, in a case where the instruction to move in the direction of the target object continues for a certain time period, the electric vehicle closer to the target object at a second speed lower than the first speed and causing the electric vehicle to stop again at a position at which the distance between the electric vehicle and the target object reaches a second stop distance shorter than the first stop distance.

2. The control method for an electric vehicle, according to claim 1, wherein, in a case where the electric vehicle is moved away from the target object based on the instruction, the electric vehicle is moved at the second speed until a position at which the distance between the electric vehicle and the target object reaches a third stop distance, then the electric vehicle is moved at the first speed after the distance between the electric vehicle and the target object exceeds the third stop distance.

3. The control method for an electric vehicle, according to claim 2,
   wherein the first stop distance is variable, and
   wherein the third stop distance of a case where the electric vehicle moves away from the target object is larger than the first stop distance of a case where the electric vehicle moves closer to the target object.

4. The control method for an electric vehicle, according to claim 1, wherein the second speed is a constant speed.

5. The control method for an electric vehicle, according to claim 1,
   wherein the electric vehicle includes a running-state notifier that notifies a running state, and
   wherein contents notified by the running-state notifier differ between a case where the electric vehicle moves at the first speed and a case where the electric vehicle moves at the second speed.

6. The control method for an electric vehicle, according to claim 5, wherein the running-state notifier audibly notifies a running state through generation of sound.

7. The control method for an electric vehicle, according to claim 5, wherein the running-state notifier visually notifies a running state by lighting or blinking of illumination or change of color.

8. The control method for an electric vehicle, according to claim 1, wherein the certain time period is from 0.5 seconds to 1 second.

9. The control method for an electric vehicle, according to claim 1, wherein the first stop distance is not less than 0.5 m and is not greater than 3 m.

10. The control method for an electric vehicle, according to claim 1, wherein the second stop distance is not less than 0.05 m and is not greater than 1 m.

11. An electric vehicle comprising a controller that performs control by the control method according to claim 1.

* * * * *